United States Patent [19]
Gerlach

[11] 3,910,112
[45] Oct. 7, 1975

[54] FLOW METER

[75] Inventor: C. Richard Gerlach, San Antonio, Tex.

[73] Assignee: Southwest Research Institute, San Antonio, Tex.

[22] Filed: May 17, 1974

[21] Appl. No.: 470,813

[52] U.S. Cl.................................. 73/210; 73/239
[51] Int. Cl.² ........................................... G01F 1/00
[58] Field of Search...... 73/239, 248, 207, 208–210, 73/232

[56] References Cited
UNITED STATES PATENTS
2,061,852  11/1936  Schweitzer........................ 73/210 X
3,789,664  2/1974   Bozek................................ 73/210 X

*Primary Examiner*—Harry N. Haroian
*Attorney, Agent, or Firm*—Cox, Smith, Smith, Hale & Guenther Inc.

[57] ABSTRACT

A flow meter is described which provides a linear readout signal proportional to flow therethrough and which can compensate for changes in the viscosity of the fluid. The flow meter is designed for in-line installation. The working element consists of two spring-restrained pistons mounted on a common stem. One of the pistons moves axially inside a contoured cylinder providing a nonlinear area-displacement characteristic. The cylinder contour, and the nonlinear area displacement characteristic thereof, is designed to produce a linear relationship between the piston displacement and fluid flow rate. The second piston provides the viscosity-compensating correction force to give an accurate flow indication in the presence of changes of fluid viscosity. The stem upon which the pistons are mounted extends into a calibrated readout scale to provide an indication of flow rate as a function of piston displacement.

11 Claims, 3 Drawing Figures

FLOW METER

BACKGROUND OF THE INVENTION

Numerous methods may be applied for the purpose of determining the amount of fluid flowing in a conduit. Volumetric measurement, meters employing impellers or cups, salt dilution, salt injection, electrical conductivity measurements, observation of gas bubbles, measuring the rise in pressure, float-type devices such as a rotameter, and weirs, orifices or nozzles are some of the methods and/or apparatus presently used to determine the rate of flow.

The measurement of fluid flow is required in numerous operational applications where the flow rate must be known in order to properly control a process, product or any other precedure requiring a known flow rate. Accurate measurement is especially difficult where the fluid being measured is highly viscous and where, in addition, the variations in temperature are substantial. In these instances the effect of viscosity changes upon the accuracy of the flow rate readout will be substantial possibly causing errors which may easily exceed the accuracy required for that particular application.

The viscosity of the fluid, often called its internal friction, can be generally described as the ease with which the molecules of a liquid slide over and/or by one another. It is the physical property of a fluid that enables it to develop and maintain a certain amount of shearing stress, dependent upon the velocity of flow, and then to offer the continued resistance to flow. The viscosity coefficient will change with temperature and density variations of the fluid. (The density as discussed here is its weight in relation to its volume, or weight per unit volume.) Since liquids differ in viscosity, it is particularly advantageous to have a viscosity-compensated flow meter.

In those applications where different fluids are transported through the same line at different times, the flow meter used to measure the rate of flow must compensate for viscosity, or the inaccuracies in the readout will be excessive. Based on the properties of the fluid being transported, special care must be taken to select the proper flow meter. If the meter compensates for viscosity, it can be used for various fluids or for fluids where temperature variations cause large changes in viscosity. Presently, if different fluids with varying viscosities are being processed, it is necessary to stock a number of different models and makes of flow meters having set calibrations for certain limited viscosity ranges. With a viscosity-compensating flow meter, the initial selection of the meter is substantially simplified, since a single meter can be used for many different types of fluids.

There are other applications of flow meters where the accuracy of the readout is not critical, and variations of several percentage points from the actual flow rate are acceptable. The flow readout accuracy is dependent upon the fluid density and viscosity. When operated within the specified range of the fluid properties, a meter that does not compensate for changes in the viscosity of the fluid will provide an indication of the flow rate that is accurate within a specified percentage of the actual flow rate.

SUMMARY OF THE INVENTION

The present invention employs dual spring-restrained pistons connected by a common stem. One of the pistons moves axially inside a contoured cylinder to provide a nonlinear area-displacement characteristic. The cylinder contour is designed to produce a linear relationship between the piston displacement and the fluid flow rate; therefore, the piston position provides a direct indication of the flow rate. The piston works against a restraining spring. The differential pressure across the piston is linearly proportional to flow through the flow meter and piston displacement provides an accurate indication of flow rate. This new concept of flow meter has a flow readout accuracy which is dependent upon fluid density and viscosity. It must be operated within a specific range of fluid properties in order to obtain a readout which is accurate within a designated percentage of the actual flow rate. If an accurate readout independent of the change in fluid viscosity is desired, a viscosity compensating feature can be incorporated into the flow meter.

This invention relates to the measurement of the flow of fluid in a conduit and particularly in the instance where the fluid flowing through the conduit has a viscosity that will vary with changes in temperature.

One of the principal objects of this invention is, therefore, to provide an apparatus to measure the fluid flow rate through a conduit.

Another important object of this invention is to produce an apparatus which will measure the fluid flow rate and compensate for changes in viscosity of the fluid.

An additional important object of this invention is to provide a flow meter which furnishes a simple, reliable and linear indication of the flow rate of fluid in a conduit.

Another important object of this invention is to provide a flow meter which will produce a linear readout of fluid flow rate as a result of piston displacement within a contoured cylinder.

Another important object of this invention is to provide a flow meter with a hydromechanical correction force to compensate for changes in viscosity of the fluid.

Still other objects of this invention will be more clearly apparent by reference to the following description when taken in conjunction with the accompanying drawings.

DESCRIPTION OF THE PREFERRED EMBODIMENT

Figure 1:
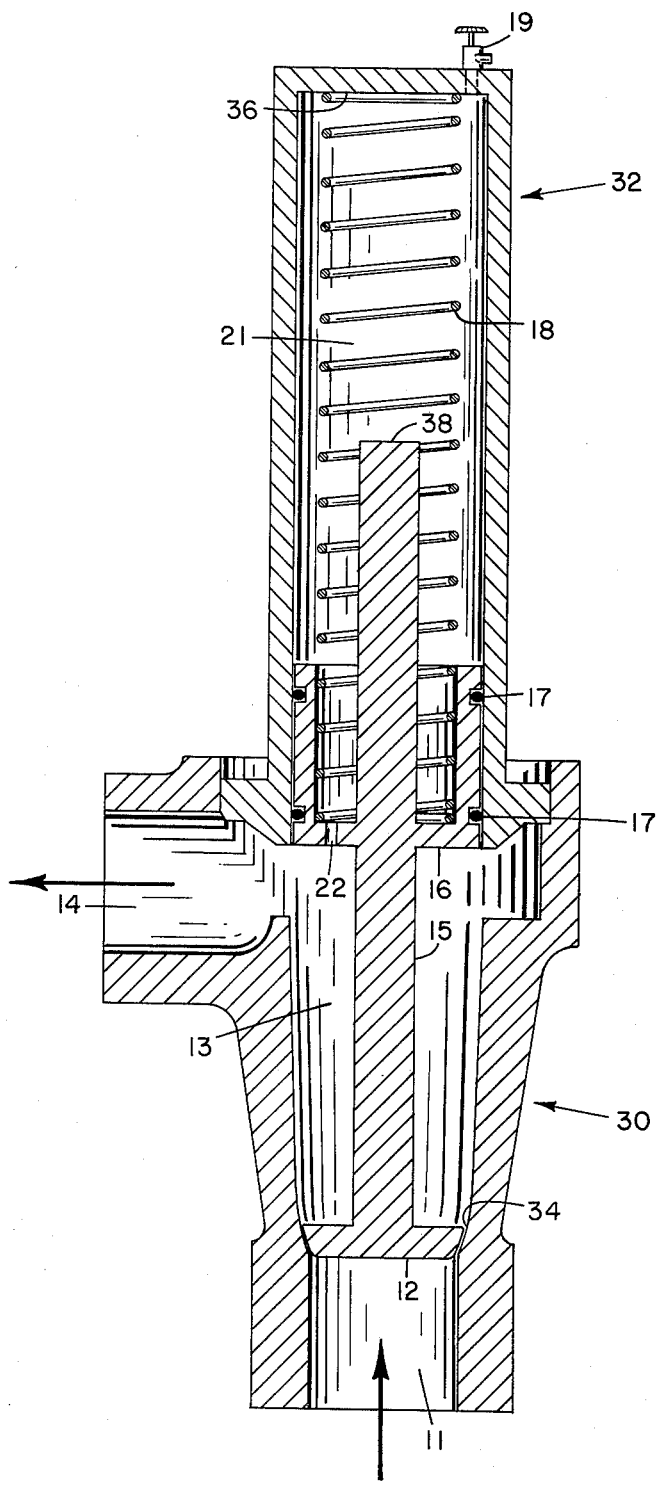
FIG. 1 is a sectional plan view of the flow meter illustrating the internal structure of the apparatus.

In FIG. 1 the sectional view shows the internal structure of the flow meter and the external readout scale which indicates rate of flow of the fluid. The flow meter is designed to be mounted in-line with the conduit (not shown) carrying the fluid whose flow rate is to be measured. Fluid enters the flow meter through the opening 11, passes around the primary piston 12 and enters cylinder 13 in the main body 30 of the flow meter. It exits from the cylinder 13 through the opening 14 and continues on through the connecting conduit (not shown). The arrows indicate the direction of flow of the fluid.

The only moving part in the flow meter is the dual piston consisting of the primary piston 12 and the secondary piston 16 connected by stem 15. The pistons 12 and 16 are connected to the stem 15 by any suitable means such as welding. The stem extends into the readout area 32 where it indicates the rate of flow on the flow-rate indicator 20. The restraining spring 18 causes the primary piston 12 to extend into the tapered end 34 of the cylinder 13. When there is no fluid flowing the primary piston 12 extends to its maximum distance within the cylinder 13 with the piston 12 seating in the contoured neck of the cylinder 13. The flow meter will indicate a zero flow rate when the primary piston 12 extends to the point where it seats in cylinder 13. In FIG. 1, essentially no fluid is flowing through the flow meter. The restraining spring 18 is seated between the extreme end 36 of cylinder 21 and secondary piston 16. Also at the extreme end 36 of cylinder 21 is a vent 19 which is used to vent the air in cylinder 21 and preload it with the fluid in the conduit whose flow rate is to be measured.

There is an appropriate seal 17 between the secondary piston 16 and the wall of cylinder 21 so that fluid will not flow past the seal 17 from cylinder 21 into cylinder 13. The seals 17 also act as a bearing element between cylinder 21 and secondary piston 16. The path of the fluid entering or leaving cylinder 21 is through a small port 22 located in the base of the secondary piston 16. As the dual piston arrangement, consisting of primary piston 12 and secondary piston 16 connected by stem 15, moves in response to the flow of fluid through the conduit, the fluid in cylinder 21 flows through port 22 to equalize the pressure in cylinder 21 and cylinder 13.

The internal walls of cylinder 13 are designed to have a special contour. Fluid flow around the primary piston 12 results in a direct readout of the flow rate as a function of piston travel within the cylinder 13. The piston 12 is sized such that a substantial difference exists between the diameter of the leading edge and the trailing edge. With this design feature, the piston alignment will not become critical, and it will seat properly when there is zero fluid flow. As the fluid flows the pressure drop across the piston 12 will cause it to move in the direction of the fluid flow and against the restraining spring 18. The spring 18, with spring constant K, is selected to provide a desired preload on the primary piston 12. By knowing the preload factor, the pressure drop across the piston 12, the spring calibration, and the wall contour of cylinder 13, the flow characteristics of the fluid can be determined.

The flow of fluids depends upon a dimensionless ratio or number called the "Reynolds Number" and is found as follows:

$$\text{Reynolds Number} = \frac{\omega d/\rho}{\mu}$$

where
$d$ = the Diameter of the Pipe, Feet
$\omega$ = the Velocity of Flow, Feet per Second
$\rho$ = the Density of the Fluid, Slugs per Cubuc Feet
$\mu$ = the Absolute Viscosity, (Poises) Slugs/Sec/Ft.

The Reynolds Number indicates the type of flow of a fluid in motion. There is a critical ratio above which flow is turbulent and below which flow is nonturbulent, or viscous. It is desirable to have a flow meter whose performance is affected as little as possible by the Reynolds Number. The contour of the cylinder 13 in which the primary piston 12 acts and the sharp trailing edge of the piston 12 are designed to reduce the effect caused by variations in the Reynolds Number. These design features are effective as exhibited by the linear and reliable indication of the fluid flow rate by the flow meter.

The capability of providing a direct readout as a function of piston travel is the result of designing the piston and cylinder to comply with the calculated theory of operation. Assume first a fluid flow through the meter such that a large Reynolds Number results. With this condition the piston 12 to wall contour flow discharge coefficient is substantially constant. The flow rate to deflection characteristics can be predicted by:

$$Q = C_d A(x) \sqrt{\frac{2 \Delta P}{\rho}}$$

Where Q = the volume flow rate
$C_d$ = Discharge coefficient
$A(x)$ = the annular area between piston 12 and cylinder 13 which is a function of piston travel X
$\rho$ = fluid density
$\Delta P$ = pressure drop across piston Assume that the pressure drop $\Delta P$ and piston travel $X$ are related by: $(\Delta P)(Ap) = (K)(x)$
where $Ap$ = surface area of the piston
$K$ = spring constant
$x$ = piston travel
and, $A(x) = C_1 \sqrt{x}$
where $C_1$ = arbitrary constant
then $Q = C_d C_1 \sqrt{x} \sqrt{\frac{2(K)(x)}{\rho Ap}}$ $$Q = C_d C_1 X \sqrt{\frac{2K}{\rho Ap}}$$

Therefore if $C_d$ is constant, then Q (the volume flow rate) is proportional to x, the piston travel.

The factors $C_1$, Ap and K are parameters which can be selected to give the particular design that is desired. This information, combined with the weight flow of the fluid and the Reynolds Number, is used to determine the required piston travel for a specific flow rate. The flow rate readout scale 20 is calibrated to provide the flow rate as a direct function of the position of piston 12. The accuracy of the readout is dependent upon the fluid viscosity and, therefore, the accuracy for a meter stated in percentages of true flow is applicable only within a specific range of fluid properties.

METHOD OF OPERATION

As the fluid flow through the conduit 11 increases, the differential pressure between the fluid in the conduit 11 and the cylinder 13 causes the piston 12 to move against the restraining spring 18. The piston 12 moves toward the fluid outlet 14 with an increasing fluid flow rate, and the secondary piston 16 correspondingly moves farther into cylinder 21. The end 38 of the stem 15 provides the indication of flow rate readout in relation to the calibrated readout scale 20. (See FIG. 2) The readout scale 20 is on a window provided in the wall of the cylinder 21 through which the end 38 of stem 15 can be observed. It is also possible to provide appropriate apparatus to obtain a remote readout of the flow rate.

Figure 2:
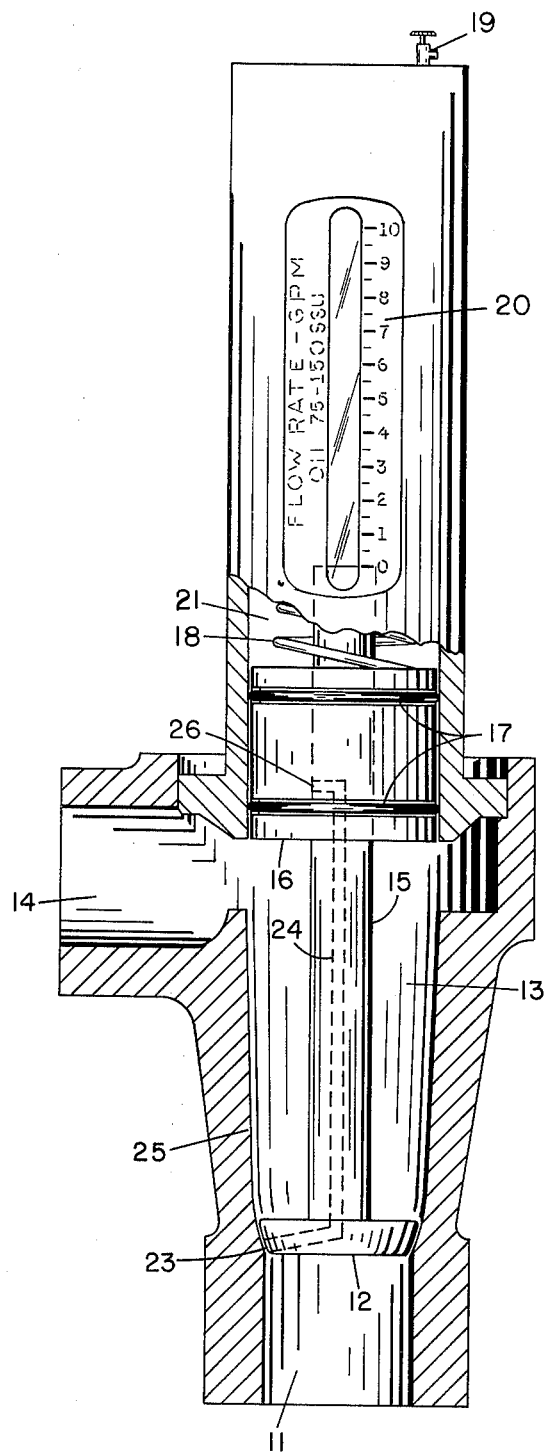
FIG. 2 is a sectional plan view of the flow meter illustrating the location of the port through which the fluid flows to provide the correction force that is a function of fluid viscosity.

In FIG. 2 of the sectional view of the Viscosity Compensated Flow Meter shows a cutaway to reveal the internal structure and, more specifically, the element 5 which provides viscosity compensation. With the use of the Viscosity Compensated Flow Meter it is possible to measure the flow rate of fluids which have a viscosity that varies substantially with changes in temperature or it can be used with various fluids having different viscosities.

The only change between the compensated and uncompensated flow meter is the location and function of the port between cylinder 21 and cylinder 13. The port 22 in the uncompensated meter shown in FIG. 1 is no longer present. A port 24 shown in FIG. 2 on the compensated meter connects cylinder 21 to the edge of piston 12. The port 24 has an orifice 26 in the stem 15 within cylinder 21. It runs from the orifice 26 through the stem 15 to piston 12 where it angles and terminated at an orifice 23 located on the annular portion of piston 12.

Figure 3:
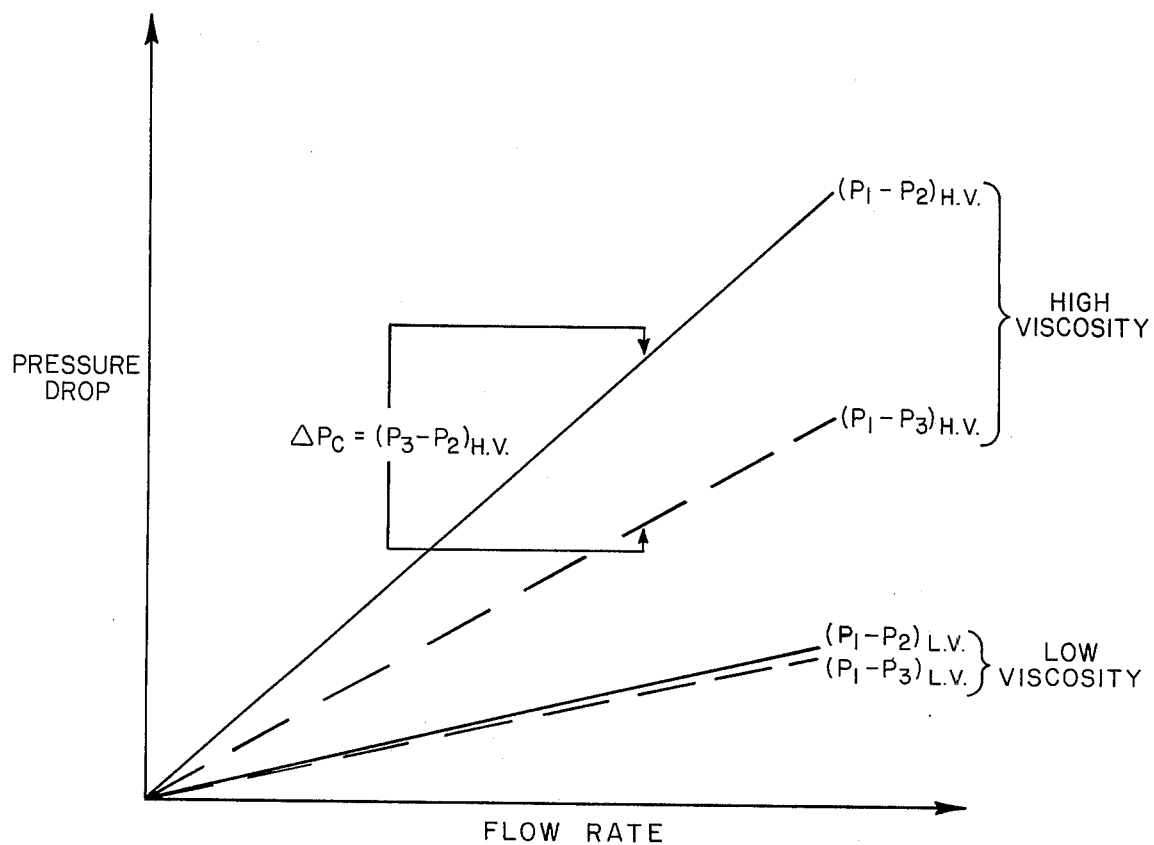
FIG. 3 is a diagram showing the pressures present in the flow meter to aid in explaining the theory of operation of the viscosity-compensating features.

Referring now to FIG. 3, Pressure $P_1$ is defined as the pressure upstream of the primary piston 12 within the conduit at the opening 11. The pressure $P_2$ is the pressure downstream of the piston 12 within cylinder 13 and pressure $P_3$ is the pressure at the annular region of the primary piston 12 or at orifice 23. The pressure $P_3$ at the annular region of the primary piston 12 is the same as the pressure within cylinder 21 because of the port 24 interconnecting the two areas.

The curves shown in FIG. 3 indicate the interrelationship between increasing pressure drop and flow rate for fluids of high and low viscosity. From laboratory tests it has been determined that the pressure drop $(P_1 - P_2)$ and $(P_1 - P_3)$ will behave as shown by the curves in FIG. 3. In general, for low viscosity fluids, $(P_1 - P_2)_{L.V.}$ and $(P_1 - P_3)_{L.V.}$ vary in proportion to flow rate, and the difference between the pressure drops is small. The pressure drop $(P_1 - P_2)_{L.V.}$ is approximately equal to pressure drop $(P_1 - P_3)_{L.V.}$. This results because the fluid flow within the contoured cylinder wall 25 around the annular region of the primary piston 12 in which orifice 23 is located has the characteristic of inlet flow through an orifice having a sharp terminating edge. Therefore, under conditions of low fluid viscosity, the viccosity compensating feature of the flow meter will have little effect upon the flow rate of the fluid as it passes through the meter. In contrast to this, with fluids of high viscosity flowing through the meter, there is a substantial difference in pressure drop between $(P_1 - P_2)$H.V. and $(P_1 - P_3)$H.V. The pressure at the orifice 23 is greater than pressure $P_2$ within cylinder 13.

The difference in pressure $(P_3 - P_2)$H.V. is called $\Delta P_c$ and is also shown in FIG. 3. The accuracy of the compensated flow meter may be maintained within a percentage of true flow by use of a corrected pressure $(P_1 - P_3)c$, which is constant as viscosity changes, where:

$(P_1 - P_3)c = (P_1 - P_3)$H.V. $- \Delta P_c$ and $(P_1 - P_3)_c \cong (P_1 - P_2)_{L.V.} \cong (P_1 - P_3)_{L.V.}$ The net fluid force upon the dual piston is determined as follows:

$F = P_1 A_1 + P_2 A'_2 - P_2 A'_1 - P_3 A_2$ where $F$ = net fluid force acting against spring
$P_1$ = fluid pressure in the conduit at opening 11
$P_2$ = fluid pressure in cylinder 13
$P_3$ = fluid pressure in cylinder 21
$A_1$ = surface area of piston 12 acted on by fluid pressure within the conduit at opening 11
$A_2$ = surface area of piston 16 acted on by fluid pressure within cylinder 21
$A'_1$ = surface area of piston 12 acted on by fluid pressure within cylinder 13
$A'_2$ = surface area of piston 16 acted on by fluid pressure within cylinder 13

Rearranging the previous equation gives $F = P_1 A_1 + P_2(A'_2 - A'_1) - P_3 A_2$ By designing the dual piston such that:

$A'_2 - A'_1 \cong A_1$ and $A_2 \cong 2A_1$ then $F = P_1 A_1 = P_2 A_1 - 2P_3 A_1 = A_1 (P_1 - P_3) - A_1 (P_3 - P_2)$ From laboratory tests with high viscosity fluids it has been determined that the net fluid force $F = [A_1 (P_1 - P_3) - A_1 (P_3 - P_2)]$ High Viscosity is substantially equal to the net fluid force $F = [A_1 (P_1 - P_2)]$ Low Viscosity since $P_3 \cong P_2$ and $P_3 - P_2 \cong 0$ for low viscosity fluids. This is shown in graphic form in FIG. 3 since:

$(P_1 - P_3)$ H.V. $- (P_3 - P_2)$ H.V. $\cong (P_1 - P_2)_{L.V.} \cong (P_1 - P_3)_{L.V.}$ or as discussed earlier:

$(P_1 - P_3)_c = (P_1 - P_3)$ H.V. $- \Delta P_c \cong (P_1 - P_2)_{L.V.} \cong (P_1 - P_3)_{L.V.}$ Therefore it follows that a flow meter of the present design as shown in FIG. 3 will automatically compensate for changes in viscosity.

The unique linear output capabilities of this flow meter make it adaptable to numerous applications in addition to the normal flow monitoring functions. For example, it could be used for closed loop speed control of a hydraulic motor by using the remote meter output, which would be either a differential pressure or an electrical signal to provide a flow rate signal to a control valve. By using the viscosity compensated version of the flow meter as a flow feedback element, it would be possible to maintain accurate flow control or process fluids having different fluid property variations by again using either a differential pressure or an electrical signal from a remote meter output.

Therefore, it is evident that the present invention describes a flow meter which provides a linear readout signal proportional to throughflow and which can compensate for the viscosity of the fluid flowing. The present invention is well adapted to carry out the objects and ends mentioned, as well as those inherent therein. While presently preferred embodiments of the invention have been given for the purpose of disclosure, numerous changes in the details of the construction and the combination, shape, size, and arrangement of parts may be resorted to without departing from the spirit and scope of the invention as hereinafter claimed.

What is claimed is:

1. A flow meter comprising;
a housing having an inlet and outlet means;
a contoured cylinder in said housing with said contour being progressively outward from a small end to a large end thereof, said inlet means being in a flow relationship with said small end and said outlet means being in a flow relationship with said large end;

first piston means in said contoured cylinder;

a uniform cylinder in said housing and in substantially parallel alignment with said contoured cylinder;

second piston means in said uniform cylinder, said second piston means attached to said first piston means for movement therewith;

resilient means for urging said first piston means towards said small end of said contoured cylinder;

port means through said second piston means connecting fluid in said housing to said uniform cylinder;

means for measuring the movement of said first and second piston means;

said first piston means being moved axially along said contoured cylinder with said movement of said first and second piston means being a linear function of said fluid flowing through said housing of said flow meter, said second piston means and said port means compensating for changes in viscosity of said fluid.

2. The flow meter as recited in claim 1 wherein said measuring means provides a direct means for indicating fluid flow through said flow meter, said direct indicating means being said linear function of flow.

3. The flow meter as recited in claim 2 wherein the annular area between said primary piston and said contoured cylinder varies as a square root function of piston displacement.

4. The flow meter as recited in claim 3 wherein said port means connects said uniform cylinder and said large end of said contoured cylinder.

5. The flow meter as recited in claim 3 wherein said port means connects said uniform cylinder and the leading outside surface of said first piston means.

6. The flow meter as recited in claim 3 wherein direct indicating means is a window in said housing having a scale thereon to directly read movement of said first and second piston means in terms of flow rate.

7. The flow meter as recited in claim 6 further including a valve means for draining said uniform cylinder and filling with fluid flowing through said flow meter.

8. The flow meter as recited in claim 7 further including a stem for attaching said first piston means to said second piston means.

9. The flow meter as recited in claim 5 further includes seal means between said second piston means and said uniform cylinder.

10. The flow meter as recited in claim 9 further including a stem for attaching said first piston means to said second piston means, said port means being from said leading outside surface of said first piston means, through said stem and second piston means to said uniform cylinder.

11. The flow meter as recited in claim 10 further including a bleed valve connected to said uniform cylinder and a window having a scale thereon to visually see the movement of said first and second pistons and said stem to determine rate of flow through said flow meter.

* * * * *